US012804092B2

(12) United States Patent
Chin et al.

(10) Patent No.: US 12,804,092 B2
(45) Date of Patent: Nov. 17, 2026

(54) CONTROL APPARATUS, IMAGE FORMING APPARATUS, AND NON-TRANSITORY COMPUTER READABLE MEDIUM

(71) Applicant: FUJIFILM BUSINESS INNOVATION CORP., Tokyo (JP)

(72) Inventors: Okan Chin, Kanagawa (JP); Jun Nagumo, Kanagawa (JP); Eri Hirakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/364,187

(22) Filed: Aug. 2, 2023

(65) Prior Publication Data

US 2024/0259510 A1 Aug. 1, 2024

(30) Foreign Application Priority Data

Jan. 27, 2023 (JP) ................................ 2023-011182

(51) Int. Cl.
*H04N 1/00* (2006.01)

(52) U.S. Cl.
CPC ..... *H04N 1/00824* (2013.01); *H04N 1/00411* (2013.01); *H04N 1/00631* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS 8,351,091 B2 * 1/2013 Kojima .............. H04N 1/32769
358/1.15

FOREIGN PATENT DOCUMENTS

| | | | |
|---|---|---|---|
| JP | H06-067482 | A | 3/1994 |
| JP | H10-322489 | A | 12/1998 |
| JP | 2005-099223 | A | 4/2005 |
| JP | 2022-099638 | A | 7/2022 |

* cited by examiner

*Primary Examiner* — Dov Popovici
(74) *Attorney, Agent, or Firm* — Oliff PLC

(57) ABSTRACT

A control apparatus includes a processor configured to: perform, on a notifier, a first control operation that, when an image of a document placed on a reader is read by the reader and a recording medium having an image formed in response to the read image is discharged into a discharge unit, starts at a notification timing a notification prompting a user to take out the document placed on the reader; and perform, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of discharging the recording medium into the discharge unit is advanced with respect to the predetermined reference.

13 Claims, 5 Drawing Sheets

FIG. 4

| | TIME (SECONDS) |
|---|---|
| REFERENCE OPERATION | 10 |
| SELECTION OF FEEDING DEVICE 110 | +1 |
| SELECTION OF MEDIUM DISCHARGE UNIT 133 | +1 |
| SELECTION OF MEDIUM DISCHARGE UNIT 143 | +1 |
| EXECUTION OF FOLDING OPERATION | +3 |
| EXECUTION OF BINDING OPERATION | +3 |

CONTROL APPARATUS, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2023-011182 filed Jan. 27, 2023.

BACKGROUND

(i) Technical Field

The present disclosure relates to a control apparatus, an image forming apparatus, and a non-transitory computer readable medium.

(ii) Related Art

Japanese Unexamined Patent Application Publication No. 2005-99223 discloses an image forming apparatus that includes an image reading unit that reads an image of a document placed on a document holder, a printer that prints the read image, a determination unit that determines, on a copying condition, whether a notice of a left document is output at the end of printing or at the end of reading the document, and a notification unit that gives the notice of the left document at the time of the determination.

Japanese Unexamined Patent Application Publication No. 10-322489 discloses in a system an image forming apparatus that includes at least a pair of two types of apparatuses connected to each other. One type of apparatus include an image reading unit and/or an image output unit, each having a document presence detector that is on a document holder and detects the presence of a document, a unit providing an instruction controlling the operation of the image reading unit and/or the image output unit, and a memory that stores image data. The other type of apparatus includes a unit transmitting the image data, the state and operation condition of the apparatuses to the outside, and a unit receiving the image data, the state and operation condition of the apparatuses from the outside. The image forming apparatus includes a unit that gives sound or voice alert to an operator asking the operator to take out the document if a printed paper sheet is removed from a printed paper sheet detector in the image output unit in the other apparatus when the document presence detector mounted on the document holder detects a document.

Japanese Unexamined Patent Application Publication No. 6-67482 discloses a left-document alert system that includes an image information reader that reads image information on a document, a left-document detector that detects the document left on the image information reader, and an alert unit that issues an alert if the left-document detector detects a left document. The left-document alert system includes a detector that detects an object that has used an apparatus and is departing from a predetermined area close to the apparatus, a determiner that determines in accordance with a detection signal from the detector whether the object detected as being in a process of the departure has finished using the apparatus, and a controller that issues an alert with the alert unit if the determiner determines that the departure of the object is performed after having finished using the apparatus and if the left-document detector detects the left document.

Japanese Unexamined Patent Application Publication No. 2022-99638 discloses an image processing apparatus that includes a notification unit and an output unit. The notification unit notifies a user that a medium is left in the image processing apparatus. If a medium is possibly left or actually left and another operation, excluding an operation to remove the medium, is expected to be performed, the output unit outputs unconfirmed information that serves as a notification indicating that there is a new item that is to be checked by the user.

A control apparatus including a processor operating as described below may be contemplated. When an image of a document placed on a reader is read by the reader and a recording medium having an image responsive to the read image is discharged, the processor performs control on a notifier to start at a predetermined notification timing a notification prompting a user to take out the document from the reader.

The notification timing starting the notification is fixed in the control apparatus. But if a completion of discharging a recording medium into a discharge unit is delayed or advanced, the notification timing may be varied. In such a case, the document may be left.

SUMMARY

Aspects of non-limiting embodiments of the present disclosure relate to providing a control apparatus, an image forming apparatus, and a non-transitory computer readable medium restricting more a variation in a notification timing with respect to a timing of a completion of discharging a recording medium into a discharge unit than when a notification timing starting prompting a user to take out a document from a reader is fixed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control apparatus including a processor configured to: perform, on a notifier, a first control operation that, when an image of a document placed on a reader is read by the reader and a recording medium having an image formed in response to the read image is discharged into a discharge unit, starts at a notification timing a notification prompting a user to take out the document placed on the reader; and perform, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of discharging the recording medium into the discharge unit is advanced with respect to the predetermined reference.

BRIEF DESCRIPTION OF THE DRAWINGS

Exemplary embodiment of the present disclosure will be described in detail based on the following figures, wherein:

FIG. 4 is a table listing a reference time and an execution time of a function affecting a discharge time of a recording medium according to the exemplary embodiment.

DETAILED DESCRIPTION

Figure 1:
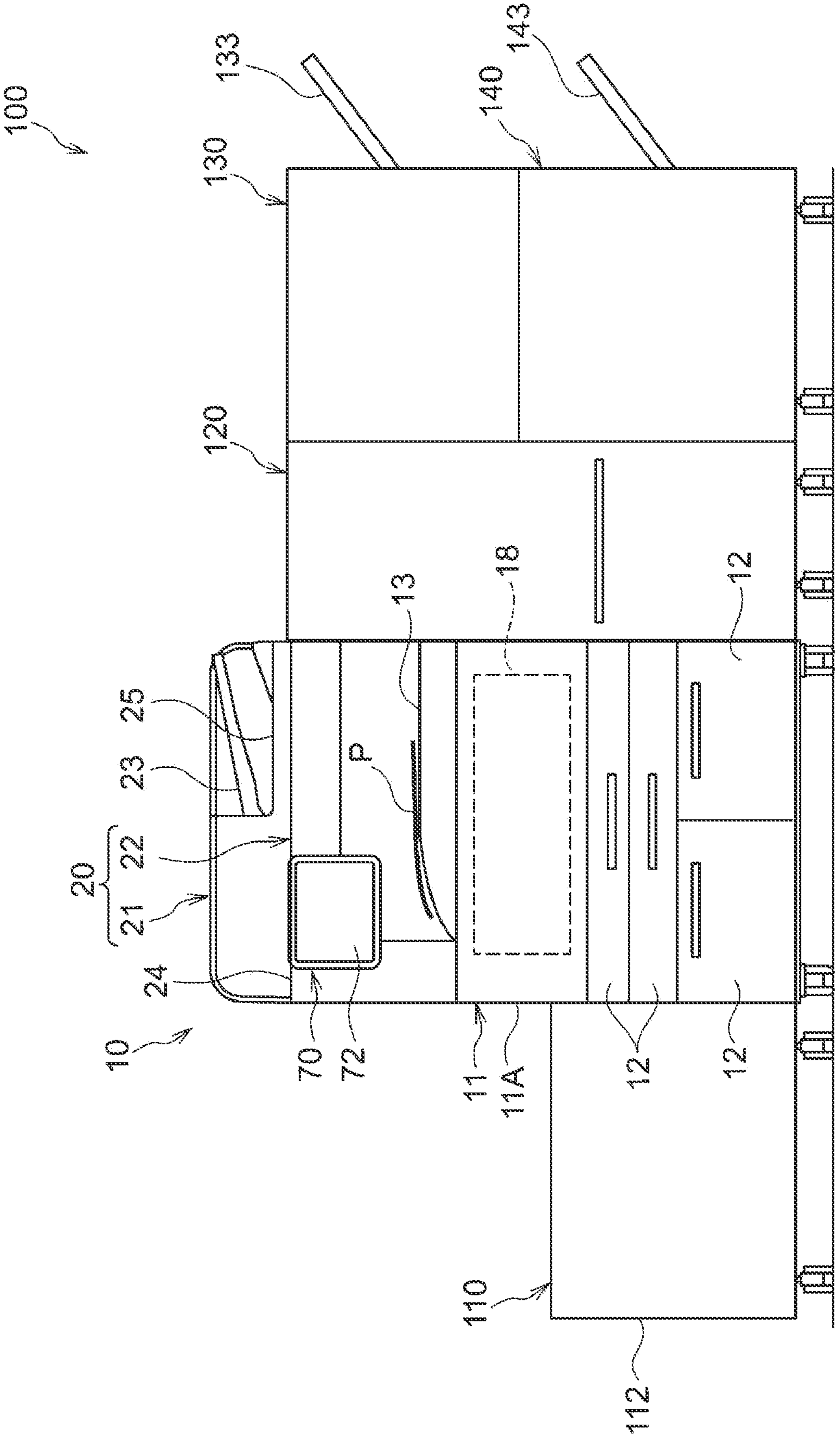
FIG. 1 schematically illustrates an image forming system of an exemplary embodiment.

Exemplary embodiment of the disclosure is described with reference to the drawings. Image Forming System An image forming system 100 of the exemplary embodiment is described below. FIG. 1 schematically illustrates the image forming system 100 of the exemplary embodiment.

The image forming system 100 forms an image on a recording medium P and includes a feeding device 110, image forming apparatus 10, post-processing devices 120 and 130, discharge device 140, and control apparatus 50 (see FIG. 2) as illustrated in FIG. 1.

Image Forming Apparatus

The image forming apparatus 10 illustrated in FIG. 1 performs an image forming process to form an image on the recording medium P. Specifically, as illustrated in FIG. 1, the image forming apparatus 10 includes an image forming apparatus body 11, medium container 12, medium discharge unit 13, image former 18, and reader 20. These elements in the image forming apparatus 10 are described below.

Image Forming Apparatus Body

The image forming apparatus body 11 illustrated in FIG. 1 includes the elements of the image forming apparatus 10. As illustrated in FIG. 1, the image forming apparatus body 11 includes a housing 11A housing the elements of the image forming apparatus 10.

Medium Container

The medium container 12 illustrated in FIG. 1 contains the recording medium P in the image forming apparatus 10. The recording medium P contained in the medium container 12 is transported to the image former 18 via a transport mechanism (not illustrated). According to the exemplary embodiment, multiple medium containers 12 are mounted in the image forming apparatus body 11. The recording medium P is, for example, a paper sheet.

Medium Discharge Unit

The medium discharge unit 13 illustrated in FIG. 1 is an example of a discharge unit and the recording medium P having an image formed thereon in the image forming apparatus 10 is discharged into the medium discharge unit 13. The medium discharge unit 13 is mounted in an upper portion of the image forming apparatus body 11. The recording medium P having the image formed by the image former 18 is transported by the transport mechanism and discharged into the medium discharge unit 13 from inside the image forming apparatus body 11.

Image Former

The image former 18 illustrated in FIG. 1 forms an image on the recording medium P. The image former 18 maybe an electrophotographic image former that forms an image on the recording medium P using toner or an ink-jet image former that forms an image on the recording medium P using ink.

The electrophotographic image former performs operations for charging, exposure, development, transfer and fixing, thus forming the image on the recording medium P. The electrophotographic image former may perform the operations for charging, exposure, development, transfer and fixing, thus forming the image onto a transfer body and then transferring the image from the transfer body to the recording medium P. The electrophotographic image former may thus form the image on the recording medium P.

The ink-jet image former forms an image on the recording medium P by ejecting ink drops to the recording medium P via an ink ejection unit. Alternatively, the ink-jet image former may form the image on the recording medium P by ejecting ink drops onto a transfer body from an ink ejection unit and then by transferring the ink drops from the transfer body to the recording medium P.

The image former is not limited to the electrophotographic image former and the ink-jet image former and may be one of a variety of image formers.

Reader

The reader 20 illustrated in FIG. 1 reads an image of a document in the image forming apparatus 10.

Referring to FIG. 1, the reader 20 includes a first reading unit 21 reading the image of a document while the document is being transported and a second image reading unit 22 reading the image of the document placed on the placement surface 24.

The first reading unit 21 includes a document holder 23, document discharge unit 25, reading device (not illustrated). A document is transported from the document holder 23 toward the document discharge unit 25 in the first reading unit 21 and in the middle of the path of the document, the reading device reads the image of the document. The document is discharged into the document discharge unit 25.

The first reading unit 21 maybe pivotally opened along the rear side thereof, namely, the lower end of thereof (at the deep side of a paper sheet) with respect to the image forming apparatus body 11 such that the forward side (at the front side of the paper sheet) is raised or lowered. Referring to FIG. 1, the first reading unit 21 is in a closed state with the image forming apparatus body 11.

The second image reading unit 22 includes the placement surface 24 and reading device (not illustrated) mounted beneath the placement surface 24. Specifically, the placement surface 24 is a platen glass. A user puts a document on the placement surface 24, thereby placing the document on the placement surface 24.

In the second image reading unit 22, the document is placed on the placement surface 24 with the first reading unit 21 opened from the image forming apparatus body 11 and is read by the reading device with the first reading unit 21 closed on the image forming apparatus body 11.

If the image of the document is read via the first reading unit 21 in the reader 20, the user may take out the document from the document discharge unit 25. If the image of the document is read using the second image reading unit 22, the user may take out the document from the placement surface 24.

Feeding Device

The feeding device 110 feeds the recording medium P to the image forming apparatus 10. The feeding device 110 includes a housing 112 containing the recording medium P and transport mechanism (not illustrated). In the feeding device 110, the transport mechanism transports the recording medium P from the housing 112 toward the image forming apparatus body 11.

A transport path and transport time are longer when the recording medium P is transported from the feeding device 110 to the image former 18 than when the recording medium P is transported from the medium container 12 to the image former 18. When the recording medium P is transported from the feeding device 110, a discharge time of the recording medium P to the medium discharge unit 13 is also longer.

Post-processing Devices

The post-processing devices 120 and 130 perform post-processing operations on the recording medium P having an image formed thereon. The post-processing device 120 is designed to be able to perform on the recording medium P transported from the image forming apparatus 10 a folding operation as a post-processing operation to fold the recording medium P along a fold line.

The post-processing device 130 is designed to be able to perform on multiple recording media P from the post-processing device 120 a binding operation as a post-processing operation to bind the recording media P with a stapler.

The post-processing operations are to be performed on the recording media P having images formed thereon. The post-processing operations are not limited to the folding operation and binding operation. The post-processing operations may include a bookbinding operation of the recording media P, a cutting operation of the recording media P, and/or a punching operation to punch the recording media P. The post-processing operations may be any operation to be performed on the recording media P having images formed thereon.

According to the exemplary embodiment, the post-processing device 130 includes a medium discharge unit 133 into which the recording medium P having an image formed thereon is discharged. An image-formed recording medium P having undergone at least one of the folding operation or the binding operation may be discharged into the medium discharge unit 133. An image-formed recording medium P may be discharged into the medium discharge unit 133 without undergoing both the folding operation and the binding operation. The medium discharge unit 133 is an example of a discharge unit.

The post-processing devices 120 and 130 may perform the post-processing operations on the recording media P. An operation time of the recording medium P and a discharge time of the recording medium P to complete the discharging are longer when post-processing operations are performed on the recording medium P than when only the image forming process is performed on the recording medium P on the image forming apparatus 10. A transport path and a transport time are longer when the recording medium P is discharged into the medium discharge unit 133 than when the recording medium P is discharged in the medium discharge unit 13. For this reason, the discharge time until the recording medium P is discharged becomes longer.

Discharge Device

The discharge device 140 receives the image-formed recording medium P that is transported from the post-processing device 130. The discharge device 140 includes a medium discharge unit 143 into which the recording medium P having an image formed thereon is discharged.

After at least one of the folding operation or the binding operation is performed on the recording medium P having the image formed thereon, the resulting recording medium P may be discharged into the medium discharge unit 143. Also, the recording medium P having the image formed thereon may be discharged into the medium discharge unit 143 without undergoing both the folding operation and the binding operation. The medium discharge unit 143 is an example of the discharge unit.

The transport path and the discharge time are longer when the recording medium P is discharged into the medium discharge unit 143 than when the recording medium P is discharged into the medium discharge unit 13. The discharge time until the recording medium P is discharged thus becomes longer.

The image forming system 100 includes, as additional devices (namely, optional devices), the post-processing devices 120 and 130 and the discharge device 140 in addition to the image forming apparatus 10.

Display

A display 70 illustrated in FIG. 1 is an example of a notification apparatus and displays a variety of information to notify a user of a notification.

The display 70 includes a display screen 72 displaying a variety of information to the user. Specifically, the display 70 may be a liquid-crystal display or an organic electroluminescence (EL) display. The display screen 72 is an example of a notifier. The display 70 may also be an example of the notifier.

According to the exemplary embodiment, the display 70 functions as an operation unit on which a user performs an input operation to enter a variety of instructions to the image forming system 100. Specifically, the display 70 includes a touch panel display into which a display function and an operation function are integrated. The touch panel display is a resistive touch panel or an electrostatic capacitance touch panel and detects a touching operation of the user.

The display screen 72 in the display 70 receives instructions for a variety of operations that are to be performed by the image forming system 100. The operations include operations for scanning, printing, copying, folding and binding.

In the scanning operation, the reader 20 reads an image of a document, generating image data. In the printing operation, the image former 18 forms an image on the recording medium P. In the copying operation, the image former 18 forms an image on the recording medium P in response to the image of the document read by the reader 20.

The post-processing device 120 performs the folding operation to fold the recording medium P along a fold line. The post-processing device 130 performs the binding operation to bind the recording media P as previously described.

According to the exemplary embodiment, an instruction to add the post-processing operations (specifically, the folding operation and binding operation) to the recording medium P having an image formed thereon may be additionally provided.

The display 70 may provide a discharge destination selection instruction to select a discharge destination of the recording medium P. According to the exemplary embodiment, the discharge destination of the recording medium P may be selected from among the medium discharge unit 13, medium discharge unit 133, and medium discharge unit 143. A discharge destination selected as a discharge destination of the recording medium P from among multiple discharge destinations in the image forming system 100 (for example, the medium discharge unit 13, medium discharge unit 133, and medium discharge unit 143) is referred to as a selected discharge destination. The recording medium P having an image formed thereon is discharged to the selected discharge destination in the image forming system 100.

One of the medium discharge unit 13, medium discharge unit 133, and medium discharge unit 143 may be defaulted to be a discharge destination and thus automatically selected in a manner free from the user selection instruction on the control apparatus 50.

The display 70 may provide a feeder source selection instruction to select a feeder source of the recording medium P. According to the exemplary embodiment, the feeder source of the recording medium P may be selected from the feeding device 110 and the medium containers 12.

One of the feeding device 110 and medium containers 12 maybe defaulted to be a feeder destination and thus automatically selected in a manner free from the user selection instruction on the control apparatus 50.

The operation unit is not limited to a touch panel and may be a pointing device or an input key. The operation unit may be any device as long as the device is able to receive a user instruction.

Control Apparatus

Figure 2:
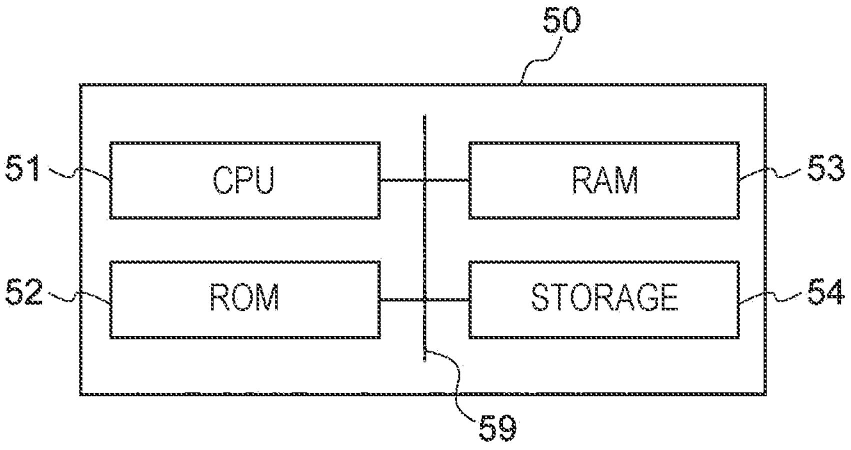
FIG. 2 is a block diagram illustrating an example of a hardware configuration of a control apparatus of the exemplary embodiment.

FIG. 2 is a block diagram illustrating an example of a hardware configuration of the control apparatus 50 of the exemplary embodiment.

As illustrated in FIG. 2, the control apparatus 50 has a function of a computer and includes a central processing unit (CPU) 51, read-only memory (ROM) 52, random-access memory (RAM) 53, and storage 54.

The CPU 51, ROM 52, RAM 53, and storage 54 are interconnected to each other via a bus 59. The CPU 51 entirely controls the control apparatus 50. The ROM 52 stores a variety of programs including a control program and a variety of data used in the exemplary embodiment. The RAM 53 serves as a work area used when the programs are executed. The CPU 51 performs a variety of operations by loading the programs from the ROM 52 to the RAM 53 and executing the loaded programs.

The storage 54 includes, for example, a hard disk drive (HDD), solid-state drive (SSD), or the like and stores a variety of programs and a variety of data. The control program may also be stored on the storage 54.

Figure 3:
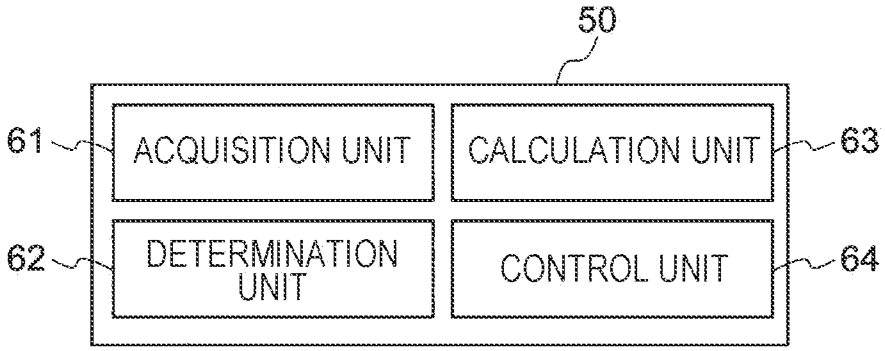
FIG. 3 is a block diagram illustrating an example of a functional configuration of the control apparatus of the exemplary embodiment.

By executing the control program, the CPU 51 in the control apparatus 50 executes a variety of functions, controlling elements including the display 70 in the image forming system 100. The functional configuration implemented when the CPU 51 serving as a hardware resource and the control program serving as a software resource cooperate with each other is described below. FIG. 3 is a block diagram illustrating an example of a functional configuration of the control apparatus 50 of the exemplary embodiment.

Referring to FIG. 3, the control apparatus 50 includes, for example, an acquisition unit 61, determination unit 62, calculation unit 63, and control unit 64.

The acquisition unit 61 acquires instruction information including an instruction the user has input via the display 70. For example, the instruction information includes information on instructions causing the image forming system 100 to perform a variety of operations, the discharge destination selection instruction, the feeder source selection instruction, and the like.

The determination unit 62 determines whether a discharge operation discharging the recording medium P to a selected discharge destination (hereinafter referred to as a copy discharge operation) is to be performed to the recording medium P having the image that is formed in response to an image of a document placed on the reader 20 and read by the reader 20. In the copy discharge operation, the recording medium P is discharged to the selected discharge destination in the copying operation. When the acquisition unit 61 receives the instruction information to execute the copying operation, the copy discharge operation is determined to be performed.

The selected discharge destination is a discharge unit that has been selected as a discharge destination of the recording medium P from among multiple discharge units ready to receive the recording medium P in the image forming system 100 (specifically, the medium discharge unit 13, medium discharge unit 133 and medium discharge unit 143).

The calculation unit 63 calculates an estimated discharge time until the recording medium P is discharged to the selected discharge destination. If a function affecting a discharge time of the recording medium P (hereinafter referred to as an affecting function) is performed in the copy discharge operation, the calculation unit 63 increases or decreases the estimated discharge time in accordance with an execution time of the affecting function. The estimated discharge time is an estimated time from the end of reading the image of the document on the reader 20 to the completion of discharging the recording medium P to the selected discharge destination.

Specifically, if the affecting function is added to reference operations to be executed by the image forming system 100, the calculation unit 63 calculates the estimated discharge time by adding the execution time of the affecting function to a reference time of the reference operation.

According to the exemplary embodiment, the reference operation refers to an operation that executes the copying operation when one of the medium containers 12 is selected as a feeder source and the medium discharge unit 13 is selected as a selected discharge destination.

Affecting functions to be added to the reference operations include a feeding operation (namely, a feeding function) in which the recording medium P is fed from the feeding device 110 with the feeding device 110 selected. The affecting functions further include a discharge operation (namely, a discharge operation) in which one of the medium discharge unit 133 and the medium discharge unit 143 is selected and the recording medium P is discharged into the selected unit. The affecting functions include at least one of the folding operation or the binding operation, each of which is performed in addition to the copying operation.

The reference time for the reference operation is a time duration from the end of reading the recording medium P on the reader 20 to the completion of discharging the recording medium P into the medium discharge unit 13 and, for example, is 10 seconds as illustrated in FIG. 4. For example, an execution time of each of the feeding operation of the recording medium P from the feeding device 110, the discharge operation of the recording medium P into the medium discharge unit 133, and the discharge operation of the recording medium P into the medium discharge unit 143 is 1 second. For example, the execution time of each of the folding operation and the binding operation is 3 seconds.

If the feeding device 110 is selected as a feeder source and the medium discharge unit 143 is selected as a discharge destination in the exemplary embodiment, the calculation unit 63 sums 10 seconds (the reference time)+1 second (the execution time of the feeding operation of the feeding device 110)+1 second (the execution time of the discharge operation to the medium discharge unit 143)+3 seconds (the execution time of the binding operation), thus determining the estimated discharge time to be 15 seconds.

When the copy discharge operation is performed and if the affecting function is difficult to perform in response to an instruction to execute the affecting function, the calculation unit 63 calculates the estimated discharge time without accounting for the execution time of the affecting function.

If the feeding device 110 is selected as a feeder source in the exemplary embodiment, the recording medium P may not be contained in the feeding device 110 or if an instruction to execute the binding operation is provided, the stapler may have no staples. In such a case, an instruction to execute the affecting function is canceled and the copy discharge operation is performed in the image forming system 100.

If the recording medium P is not contained in the feeding device 110 with the feeding device 110 selected as the feeder source, 1 second is not added as the execution time. If the stapler is not loaded with staples when the instruction to execute the binding operation is issued, the execution time of 3 seconds is not added.

The control unit 64 performs control on the display 70 (specifically, the display screen 72) to start with respect to the estimated discharge time the notification (hereinafter referred to as a prompt notification) prompting the user to take out the document from the reader 20.

According to the exemplary embodiment, the control unit 64 sets a time duration shorter than the estimated discharge time to a notification time. The notification time is a time duration from the end of reading the image of the data on the reader 20 to when the display 70 is caused to start the prompt notification. According to the exemplary embodiment, for example, the notification time is (the estimated discharge time—1 second).

When the copy discharge operation is performed, a first control operation is performed on the display 70. The control unit 64 performs the first control operation to cause the display 70 to start the prompt notification within a range of from the end of reading the image of the document on the reader 20 to the completion of discharging the recording medium P to the selected discharge destination.

In other words, the control unit 64 sets a predetermined notification timing the prompt notification to be within a range (hereinafter referred to as a range X) of from the end of reading the image of the document on the reader 20 to the completion of discharging the recording medium P to the selected discharge destination.

Specifically, the notification timing is closer to the timing of the completion of discharging the recording medium P to the selected discharge destination (hereinafter referred to as a discharge completion timing) than to the timing of the end of reading the image of the document on the reader 20 (hereinafter referred to as a reading end timing) within the range X. If the recording media P are discharged to the selected discharge destination, the discharge completion timing is when all the recording media P are discharged, namely, when the last recording medium P is discharged.

If the discharge destination that is spaced apart from the display 70 by a distance longer than a predetermined reference value is selected, the calculation unit 63 may set the notification time to be shorter than normal. For example, the calculation unit 63 sets the notification time to (the estimated discharge time-3 seconds). In this way, the control unit 64 advances the notification timing of the prompt notification from normal. This step may be performed in view of the possibility that the timing when the user leaves the display 70 to take out the recording medium P from the selected discharge destination is advanced if the selected discharge destination is spaced apart from the display 70 in this way.

The calculation unit 63 may correct the estimated discharge time if the estimated discharge time calculated exceeds a predetermined threshold. The control unit 64 may perform the prompt notification several times if the estimated discharge time calculated by the calculation unit 63 exceeds the predetermined threshold.

The control unit 64 performs, on the display 70, a second control operation to delay the start of the prompt notification if the completion of discharging the recording medium P to the selected discharge destination is delayed with respect to a predetermined reference.

According to the exemplary embodiment, the predetermined reference refers to the timing when the recording medium P is discharged into the medium discharge unit 13 in the execution of the reference operation.

In the second control operation, specifically, the control unit 64 delays the start of the prompt notification such that the start of the prompt notification is closer to the discharge completion timing than to the reading end timing within the range X when the completion of discharging the recording medium P is delayed with respect to the predetermined reference.

In the first control operation and second control operation, the control unit 64 sets a time duration from the notification timing to the discharge completion timing to be shorter than a time duration from the reading end timing to the notification timing. Specifically, in the first control operation and the second control operation, the control unit 64 causes the display 70 to start the prompt notification immediately prior to the discharge completion timing.

The event that the completion of discharging the recording medium P is delayed signifies that a path of the recording medium P to the selected discharge destination (hereinafter referred to as a discharge path) is longer than a predetermined reference length.

The discharge path is a path from any feeder source to the selected discharge destination. The predetermined reference length is a length of the path along which the recording medium P travels from any of the medium containers 12 to the medium discharge unit 13.

The discharge path is longer than the reference length in the exemplary embodiment if the feeding device 110 is selected as a feeder source. Also, the discharge path is longer than the reference length in the exemplary embodiment, if one of the medium discharge unit 133 and the medium discharge unit 143 is selected as a selected discharge destination.

The event that the completion of discharging the recording medium P is delayed signifies that an operation time of a process including image forming is longer than the predetermined reference time.

The predetermined reference time is a process time used when the reference operation is performed. Specifically, the process time is a time duration of a process in which an image is formed in the copying operation on a recording medium P transported from one of the medium containers 12 and the recording medium P having the image thereon is discharged into the medium discharge unit 13.

The process time is longer than the reference time if a post-processing operation to be performed on the recording medium P having the image formed thereon is added. According to the exemplary embodiment, the post-processing operations including the folding operation and the binding operation may be added. The post-processing operations may be settable only if an additional device (optional device) is added onto the image forming apparatus 10 in the image forming system 100.

The prompt notification may be executed by the display 70 that displays a message reading, for example, "Document is left in the reader 20 (the placement surface 24 or the document discharge unit 25)." According to the exemplary embodiment, the prompt notification is stopped when a predetermined notification period has elapsed. The prompt notification is also stopped when an instruction to stop the notification is entered by the user.

If the copy discharge operation is interrupted in the middle thereof, the control unit 64 performs control on the display 70 such that the prompt notification starts at a predetermined timing without accounting for the estimated discharge time.

Figure 5:
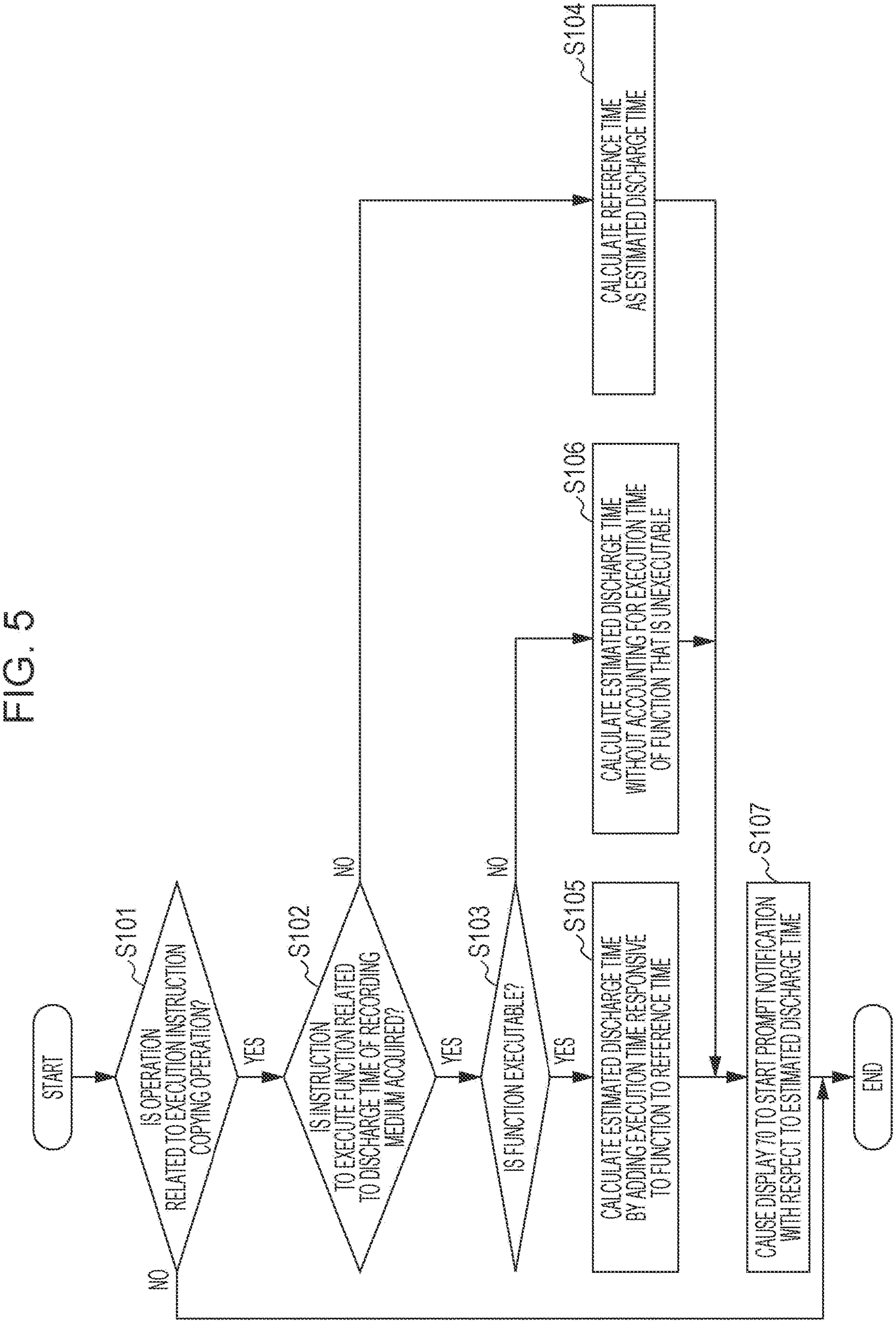
FIG. 5 is a flowchart illustrating an example of a flow of a notification process performed by the control apparatus of the exemplary embodiment.

If the copy discharge operation resumes after being interrupted, the calculation unit 63 calculates the estimated discharge time. The control unit 64 performs on the display 70 control that causes the prompt notification to start with respect to the estimated discharge time. Notification Process of Exemplary Embodiment Example of a notification process of the exemplary embodiment is described below. FIG. 5 is a flowchart illustrating an example of a flow of the notification process performed by the image forming system 100.

According to the exemplary embodiment, the CPU 51 performs the notification process by reading and executing the control program from the ROM 52 or the storage 54. For example, the notification process is started when an instruction to execute each of the operations on the image forming system 100 is acquired.

When the notification process is started as illustrated in FIG. 5, the CPU 51 determines whether an operation related to the acquired execution instruction is a copying operation (step S101). Specifically, the CPU 51 determines whether to perform the copy discharge operation.

If the CPU 51 determines that the operation related to the acquired execution instruction is a copying operation (yes path in step S101), processing proceeds to step S102. If the CPU 51 does not determine that the operation related to the acquired execution instruction is a copying operation (no path in step S101), the notification process ends.

In step S102, the CPU 51 determines whether an execution instruction of the function affecting the discharge time of the recording medium P has been acquired. If the CPU 51 determines that the execution instruction of the function affecting the discharge time has been acquired (yes path in step S102), processing proceeds to step S103. If the CPU 51 does determine that the execution instruction of the function has been acquired (no path in step S102), processing proceeds to step S104.

In step S103, the CPU 51 determines whether the function is executable. If the CPU 51 determines that the function is executable (yes path in step S103), processing proceeds to step S105. If the CPU 51 does not determine that the function is executable (no path in step S103), processing proceeds to step S106.

The CPU 51 calculates the reference time as the estimated discharge time in step S104 and proceeds to step S107. The CPU 51 calculates the estimated discharge time by adding the execution time of the function to the reference time in step S105 and then proceeds to step S107. The CPU 51 calculates the estimated discharge time in step S106 without accounting for the execution time of the function that is unexecutable and then proceeds to step S107.

In step S107, the CPU 51 causes the display 70 to start the prompt notification with respect to the estimated discharge time in step S107 and then ends the notification process. Operation of Exemplary Embodiment According to the exemplary embodiment, the CPU 51 performs on the display 70 control that causes the display 70 to delay the start of the prompt notification if the completion of discharging the recording medium P to the selected discharge destination is delayed with respect to the predetermined reference.

A variation of the notification timing with respect to the timing of the completion of discharging the recording medium P to the selected discharge destination may be controlled in comparison with the case in which the notification timing starting the prompt notification is fixed. Specifically, according to the exemplary embodiment, the variation of the notification timing with respect to the discharge completion timing may be controlled to a smaller value than when the notification timing starting the prompt notification is fixed. As a result, the possibility of leaving the document on the reader 20 maybe reduced.

According to the exemplary embodiment, in the second control operation, the CPU 51 may delay the start of the prompt notification within the range X when the completion of discharging the recording medium P to the selected discharge destination is delayed with respect to the predetermined reference.

When the completion of discharging the recording medium P to the selected discharge destination is delayed, the user may be prompted to take out the document from the reader 20 before the recording medium P discharged to the selected discharge destination is taken out.

Specifically, according to the exemplary embodiment, the CPU 51 delays the start of the prompt notification in the second control operation such that the start of the prompt notification is closer to the discharge completion timing than to the reading end timing within the range X when the completion of discharging the recording medium P is delayed with respect to the predetermined reference.

In comparison with the case in which the CPU 51 delays the start of the prompt notification in the second control operation such that the start of the prompt notification is closer to the reading end timing than to the discharge completion timing within the range X when the completion of discharging is delayed with respect to the predetermined reference, the user may recognize the prompt notification immediately prior to the discharge completion timing even when the completion of discharging the recording medium P to the selected discharge destination is delayed.

The completion of discharging the recording medium P is delayed in the exemplary embodiment if the discharge path along which the recording medium P is discharged to the selected discharge destination is longer than a predetermined reference length.

In comparison with the case in which the notification timing starting the prompt notification remains unchanged, the variation of the notification timing with respect to the timing of the completion of discharging the recording medium P to the selected discharge destination may thus be controlled even when the discharge path along which the recording medium P is discharged to the selected discharge destination is longer than the predetermined reference length.

The completion of discharging the recording medium P is delayed in the exemplary embodiment if the process time of the process including the image forming performed on the recording medium P is longer than the predetermined reference time.

In comparison with the case in which the notification timing starting the prompt notification remains unchanged, the variation of the notification timing with respect to the timing of the completion of discharging the recording medium P to the selected discharge destination may thus be controlled even when the process time of the process including the image forming performed on the recording medium P is longer.

The process time is longer than the reference time in the exemplary embodiment if a post-processing operation to be performed on the recording medium P having an image formed thereon is added.

In comparison with the case in which the notification timing starting the prompt notification remains unchanged, the variation of the notification timing with respect to the timing of the completion of discharging the recording medium P to the selected discharge destination may be controlled even when the post-processing operation performed on the recording medium P having the image formed thereon is added.

According to the exemplary embodiment, the CPU 51 calculates the estimated discharge time of the recording medium P to the selected discharge destination and performs on the display 70 control that causes the display 70 to start the prompt notification with respect to the estimated discharge time.

In comparison with the case in which the notification timing starting the prompt notification remains unchanged, the variation of the notification timing with respect to the timing of the completion of discharging the recording medium P to the selected discharge destination may be controlled.

If the function affecting the discharge time of the recording medium P is performed in the copy discharge operation in the exemplary embodiment, the CPU 51 increases or decreases the estimated discharge time in accordance with the execution time of the function.

In comparison with the case in which the estimated discharge time is calculated without accounting for the execution time of the function, the variation of the notification timing with respect to the timing of the completion of discharging the recording medium P to the selected discharge destination may be controlled.

If the instruction to execute the affecting function is acquired in the copy discharge operation in the exemplary embodiment but if the affecting function is unable to be performed, the CPU 51 calculates the estimated discharge time without accounting for the execution time of the affecting function.

In comparison with the case in which the estimated discharge time is increased or decreased in response to the execution time of the affecting function in response to the acquisition of the instruction to execute the affecting function, the variation of the notification timing with respect to the timing of the completion of discharging the recording medium P to the selected discharge destination may be controlled.

If the copy discharge operation is interrupted in the copy discharge operation, the CPU 51 performs on the display 70 control that causes the display 70 to start the prompt notification at a predetermined timing without accounting for the estimated discharge time.

Thus, if the copy discharge operation is interrupted, the possibility of leaving the document on the reader 20 maybe reduced in comparison with the case in which the prompt notification is started with respect to the estimated discharge time.

If the copy discharge operation resumes after being interrupted, the CPU 51 calculates the estimated discharge time and performs on the display 70 control that causes the display 70 to start the prompt notification with respect to the estimated discharge time.

When the copy discharge operation resumes after being interrupted, the variation of the notification timing with respect to the timing of the completion of discharging the recording medium P to the selected discharge destination may be controlled in comparison with the case in which the prompt notification is started at the predetermined timing without accounting for the estimated discharge time. Modifications of Notification Apparatus According to the exemplary embodiment, the notification apparatus (notifier) is the display 70. The notification apparatus is not limited to the display 70. For example, the notification apparatus may be of a type that gives a notification to the user using sound. Such notification apparatus may have a loudspeaker and perform the prompt notification by speaking a message "Document is left on the reader 20 (the placement surface 24 or the document discharge unit 25)." Modifications of Control Apparatus According to the exemplary embodiment, if the affecting function is added to the reference operation to be performed by the image forming system 100, the CPU 51 calculates the estimated discharge time by adding the execution time responsive to the affecting function to the reference time of the reference operation. The disclosure is not limited to this method.

If the affecting function is removed from the reference operation, the CPU 51 may calculate the estimated discharge time by subtracting the execution time responsive to the affecting function from the reference time of the reference operation. In such a case, in the reference operation, the copying operation may be performed if the feeding device 110 is selected as a feeder source and the medium discharge unit 143 is selected as a selected discharge destination.

The CPU 51 may modify the notification timing by adjusting the notification time with respect to the predetermined timing without calculating the estimated discharge time.

According to the exemplary embodiment, the notification timing is modified when the operation of modifying the length of the discharge path and the post-processing operations (the folding operation and binding operation) are performed as the functions affecting the discharge time of the recording medium P. The disclosure is not limited to this method. The affecting functions may account for the size of the recording medium P, a color mode of an image formed on the recording medium P (for example, a difference between color printing and monochrome printing), or a difference between duplex printing and simplex printing. In this case, the image forming system 100 may not necessarily include the post-processing devices 120 and 130 and discharge device 140. Specifically, the image forming system 100 includes only the image forming apparatus 10.

According to the exemplary embodiment, the notification timing is closer to the discharge completion timing than to the reading end timing within the range X in the first control operation and second control operation. The disclosure is not limited to this method. For example, the notification timing is closer to the reading end timing than to the discharge completion timing within the range X in the first control operation and second control operation.

According to the exemplary embodiment, the CPU 51 performs on the display 70 the second control operation that delays the start of the prompt notification if the completion of discharging the recording medium P to the selected discharge destination is delayed with respect to the predetermined reference. The disclosure is not limited to this method.

The CPU 51 may perform, on the display 70, a third control operation in addition to or instead of the second control operation. The third control operation advances the start of the prompt notification if the completion of discharging the recording medium P to the selected discharge destination is advanced with respect to the predetermined reference.

The CPU 51 may advance the start of the prompt notification in the third control such that the notification timing is closer to the discharge completion timing than to the reading end timing within the range X when the completion of discharging the recording medium P is advanced with respect to the predetermined reference.

The completion of discharging the recording medium P is advanced if the discharge path along which the recording medium P is discharged to the selected discharge destination is shorter than the predetermined reference length.

Also, the completion of discharging the recording medium P is advanced if the process time of the process including image forming performed on the recording medium P is shorter than the predetermined reference time.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

A control apparatus including:a
processor configured to:
perform on a notifier, a first control operation that, when an image of a document placed on a reader is read by the reader and a recording medium having an image formed in response to the read image is discharged into a discharge unit, starts at a notification timing a notification prompting a user to take out the document placed on the reader; and
perform, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of discharging the recording medium into the discharge unit is advanced with respect to the predetermined reference.

(((2)))

In the control apparatus according to (((1))), the notification timing falls within a range of from an end of reading the image of the document on the reader to an end of discharging the recording medium,
wherein the processor is configured to:
delay the start of the notification in the second control operation within the range if the completion of discharging is delayed with respect to the predetermined reference; and
advance the start of the notification in the third control operation within the range if the completion of discharging is advanced with respect to the predetermined reference.

(((3)))

In the control apparatus according to (((2))), the notification timing falls within the range and is closer to the completion of discharging than to the end of reading, and
wherein the processor is configured to:
delay in the second control operation the start of the notification, within the range obtained when the completion of discharging is delayed with respect to the predetermined reference, such that the start of the notification is closer to the completion of discharging than to the end of reading; and
advance in the third control operation the start of the notification, within the range obtained when the completion of discharging is advanced with respect to the predetermined reference, such that the start of the notification is closer to the completion of discharging than to the end of reading.

(((4)))

In the control apparatus according to one of (((1))) through (((3))), the completion of discharging is delayed if a path along which the recording medium is discharged into the discharge unit is longer than a predetermined reference length, and the completion of discharging is advanced if the path along which the recording medium is discharged into the discharge unit is shorter than the predetermined reference length.

(((5)))

In the control apparatus according to one of (((1))) through (((4))), the completion of discharging is delayed if a process time of a process performed on the recording medium and including image forming is longer than a predetermined reference time, and the completion of discharging is advanced if the process time of the process performed on the recording medium and including image forming is shorter than the predetermined reference time.

(((6)))

In the control apparatus according to (((5))), the process time is longer than the predetermined time if a post-processing operation to be performed on the recording medium having the image is added.

(((7)))

A control apparatus including:

a processor configured to:

when a discharge operation that discharges into a discharge unit a recording medium having an image formed in response to an image of a document placed on and read by a reader is performed, calculate an estimated discharge time of discharging the recording medium into the discharge unit and perform, on a notifier, a control operation that starts with respect to the estimated discharge time a notification on a user, the notification prompting the user to take out the document from the reader.

(((8)))

In the control apparatus according to (((7))), the processor is configured to, if a function affecting a discharge time of the recording medium is performed in the discharge operation, increase or decrease the estimated discharge time in accordance with an execution time of the function and perform the control operation on the notifier such that the notification starts with respect to the estimated discharge time.

(((9)))

In the control apparatus according to (((8))), the processor is configured to, if the function is difficult to perform in response to a reception of an instruction to perform the function in the discharge operation, calculate the estimated discharge time without accounting for the execution time and perform the control operation on the notifier such that the notification starts with respect to the estimated discharge time.

(((10)))

In the control apparatus according to one of (((8))) and (((9))), the processor is configured to, if the discharge operation is interrupted, perform the control operation on the notifier such that the notification starts at a predetermined timing without accounting for the estimated discharge time.

(((11)))

In the control apparatus according to one of (((8))) through (((10))), the processor is configured to, if the discharge operation resumes after being interrupted, calculate the estimated discharge time and perform the control operation on the notifier such that the notification starts with respect to the estimated discharge time.

(((12)))

A control program causing a computer to execute a process, the process including:

performing, on a notifier, a first control operation that, when an image of a document placed on a reader is read by the reader and a recording medium having an image formed in response to the read image is discharged into a discharge unit, starts at a notification timing a notification prompting a user to take out the document placed on the reader; and performing, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of discharging the recording medium into the discharge unit is advanced with respect to the predetermined reference.

(((13)))

A notification apparatus including a notifier that, when an image of a document placed on a reader is read by the reader and a recording medium having an image formed in response to the read image is discharged into a discharge unit, starts at a predetermined notification timing a notification prompting a user to take out the document placed on the reader, and the notifier performs at least one of an operation to delay a start of the notification if a completion of discharging the recording medium into the discharge unit is delayed with respect to a predetermined reference or an operation to advance the start of the notification if the completion of discharging the recording medium into the discharge unit is advanced with respect to the predetermined reference.

(((14)))

An image forming apparatus including:

a reader that reads an image of a document;

an image former that forms an image in response to the image of the document read by the reader;

a discharge unit into which a recording medium having the image formed by the image former is discharged; and the notification apparatus according to (((13))).

What is claimed is:

1. A control apparatus comprising:

a processor configured to:

perform, on a notifier, a first control operation that, when an image of a document placed on a reader is read by the reader and a recording medium having an image formed in response to the read image is discharged into a discharge unit, starts at a notification timing a notification prompting a user to take out the document placed on the reader; and perform, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of the discharging the recording medium into the discharge unit is advanced with respect to the predetermined reference, wherein the predetermined reference is based on an estimated discharge time until the discharging of the recording medium into the discharge unit.

2. The control apparatus according to claim 1, wherein the notification timing falls within a range of from an end of reading the image of the document on the reader to an end of the discharging the recording medium, wherein the processor is configured to:

delay the start of the notification in the second control operation within the range if the completion of the discharging is delayed with respect to the predetermined reference; and advance the start of the notification in the third control operation within the range if the completion of the discharging is advanced with respect to the predetermined reference.

3. The control apparatus according to claim 2, wherein the notification timing falls within the range and is closer to the completion of the discharging than to the end of reading, and wherein the processor is configured to:

delay in the second control operation the start of the notification, within the range obtained when the completion of the discharging is delayed with respect to the predetermined reference, such that the start of the notification is closer to the completion of the discharging than to the end of reading; and advance in the third control operation the start of the notification, within the range obtained when the completion of the discharging is advanced with respect to the predetermined reference, such that the start of the notification is closer to the completion of the discharging than to the end of reading.

4. The control apparatus according to claim 1, wherein the completion of the discharging is delayed if a path along which the recording medium is discharged into the discharge unit is longer than a predetermined reference length, and wherein the completion of the discharging is advanced if the path along which the recording medium is discharged into the discharge unit is shorter than the predetermined reference length.

5. The control apparatus according to claim 1, wherein the completion of the discharging is delayed if a process time of a process performed on the recording medium and including image forming is longer than a predetermined reference time, and wherein the completion of the discharging is advanced if the process time of the process performed on the recording medium and including image forming is shorter than the predetermined reference time.

6. The control apparatus according to claim 5, wherein the process time is longer than the predetermined reference time if a post-processing operation to be performed on the recording medium having the image is added.

7. A control apparatus comprising:

a processor configured to:

when a discharge operation that discharges into a discharge unit a recording medium having an image formed in response to an image of a document placed on and read by a reader is performed, calculate an estimated discharge time of discharging the recording medium into the discharge unit and perform, on a notifier, a control operation that starts with respect to the estimated discharge time a notification on a user, the notification prompting the user to take out the document from the reader.

8. The control apparatus according to claim 7, wherein the processor is configured to, if a function affecting a discharge time of the recording medium is performed in the discharge operation, increase or decrease the estimated discharge time in accordance with an execution time of the function and perform the control operation on the notifier such that the notification starts with respect to the estimated discharge time.

9. The control apparatus according to claim 8, wherein the processor is configured to, if the function is difficult to perform in response to a reception of an instruction to perform the function in the discharge operation, calculate the estimated discharge time without accounting for the execution time and perform the control operation on the notifier such that the notification starts with respect to the estimated discharge time.

10. The control apparatus according to claim 8, wherein the processor is configured to, if the discharge operation is interrupted, perform the control operation on the notifier such that the notification starts at a predetermined timing without accounting for the estimated discharge time.

11. The control apparatus according to claim 8, wherein the processor is configured to, if the discharge operation resumes after being interrupted, calculate the estimated discharge time and perform the control operation on the notifier such that the notification starts with respect to the estimated discharge time.

12. A non-transitory computer readable medium storing a program causing a computer to execute a process, the process comprising:

performing, on a notifier, a first control operation that, when an image of a document placed on a reader is read by the reader and a recording medium having an image formed in response to the read image is discharged into a discharge unit, starts at a notification timing a notification prompting a user to take out the document placed on the reader; and performing, on the notifier, at least one of a second control operation or a third control operation, the second control operation delaying a start of the notification if a completion of discharging the recording medium into the discharge unit is delayed with respect to a predetermined reference and the third control operation advancing the start of the notification if the completion of the discharging the recording medium into the discharge unit is advanced with respect to the predetermined reference, wherein the predetermined reference is based on an estimated discharge time until the discharging of the recording medium into the discharge unit.

13. An image forming apparatus comprising:

a reader that reads an image of a document;

an image former that forms an image in response to the image of the document read by the reader;

a discharge unit into which a recording medium having the image formed by the image former is discharged; and a notification apparatus including a notifier that, when an image of a document placed on a reader is read by the reader and a recording medium having an image formed in response to the read image is discharged into a discharge unit, starts at a predetermined notification timing a notification prompting a user to take out the document placed on the reader, wherein the notifier performs at least one of an operation to delay a start of the notification if a completion of discharging the recording medium into the discharge unit is delayed with respect to a predetermined reference or an operation to advance the start of the notification if the completion of the discharging the recording medium into the discharge unit is advanced with respect to the predetermined reference, wherein the predetermined reference is based on an estimated discharge time until the discharging of the recording medium into the discharge unit.

* * * * *